Aug. 27, 1935.  W. N. TUTTLE  2,012,291

MODULATION METER AND METHOD

Filed May 13, 1931

W. NORRIS TUTTLE
*INVENTOR.*

BY *Davis Rines*

*ATTORNEY.*

Patented Aug. 27, 1935

2,012,291

UNITED STATES PATENT OFFICE 2,012,291

MODULATION METER AND METHOD

William Norris Tuttle, Cambridge, Mass., assignor to General Radio Company, Cambridge, Mass., a corporation of Massachusetts Application May 13, 1931, Serial No. 536,995

22 Claims. (Cl. 179—171)

The present invention relates to the art of electric measurements, and has for its chief object to provide a new and improved method of and apparatus for measuring modulated waves, as, for example, in connection with broadcast transmitters. Another object is to provide a novel method of and apparatus for determining the modulated output of a transmitter or similar apparatus. A further object is to provide a novel and improved method of and apparatus for measuring the modulation characteristics of a generator. Other and further objects will be explained hereinafter and will be particularly pointed out in the appended claims, it being understood that it is intended, by suitable expression in the claims, to express all the novelty that the invention may possess.

Figure 1:
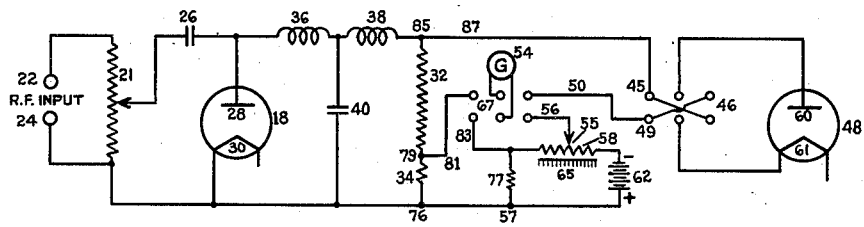
Figure 2:
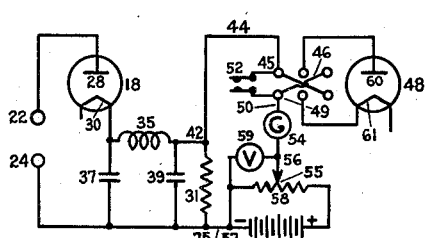
Figure 3:
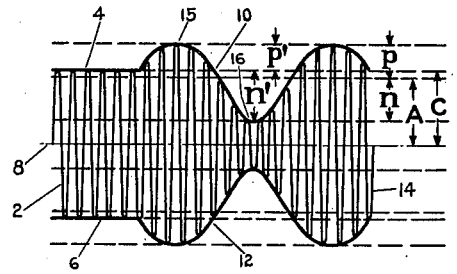
Figure 4:
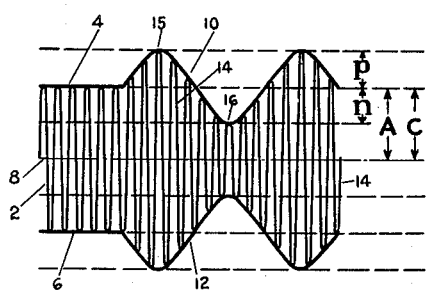
Figure 5:
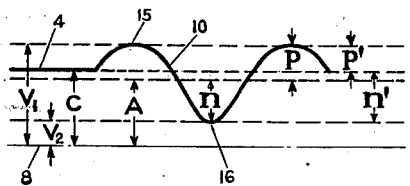

The invention will be explained more fully in connection with the accompanying drawing, in which Fig. 1 is a diagrammatic and simplified view of circuits and apparatus arranged and constructed according to a preferred embodiment of the present invention; Fig. 2 is a still further simplified view; Fig. 3 is a diagram illustrating a modulated wave; Fig. 4 is a diagram similar to Fig. 3 of an ideal wave; and Fig. 5 is a diagram of a rectified and filtered modulated wave.

Referring first to Fig. 4, a sine carrier wave 2 is diagrammatically illustrated between sections 4 and 6 of its envelope, these sections being parallel to the horizontal line or axis 8 about which the carrier wave 2 oscillates. The remaining portions 10 and 12 of the envelope, shown as enveloping the modulated carrier wave 14, are provided with positive or maximum peaks 15 and negative or minimum peaks 16. As the carrier wave is assumed, for simplicity and concreteness, to be modulated by a pure tone, the portions 10 and 12 of the envelope are likewise shown sinusoidal.

The ordinate corresponding to the distance of the portions 4 and 6 of the envelope, above or below the axis 8, is the amplitude of the unmodulated carrier wave, and may be represented by C. The ordinate corresponding to the average distance of the portions 10 and 12 of the envelope, above or below the axis 8, is the average amplitude of the modulated wave, and may be represented by A. In the pure wave of Fig. 4, A and C are identical, but they may, in practice, be different, as will be made clear from Fig. 3, illustrating a non-sinusoidal wave, as hereinafter more fully described. The deviations from the average A of the positive and negative peaks 15 and 16 during modulation may be represented respectively, by $p$ and $n$; and the corresponding deviations of the positive and negative peaks from the amplitude C of the unmodulated carrier may be represented by $p'$ and $n'$, as shown in Figs. 3 and 5.

It is, for many purposes, desirable to know the nature of the envelope,—its maximum variation in amplitude, for example, and how closely it approximates to a sinusoidal, or otherwise symmetrical, form. Thus, if the envelope is found to be unsymmetrical when a pure tone is used to produce the modulation, it is at once known that the transmitter of the radio-broadcasting station is out of adjustment. This, indeed, is a very sensitive test.

In determining the amplitude variation of a modulated wave, it is convenient to make use of a quantity $m$, known as the percentage modulation. This is the average percentage by which the peaks 15 and 16 deviate from the average envelope value A.

In the symmetrical wave illustrated in Fig. 4, as already pointed out, the average amplitude A of the modulated wave is also the amplitude C of the unmodulated carrier wave; but, in practice, as is well known, the envelope 10, 12 may vary considerably from the sinusoidal character, as illustrated in Fig. 3. The shape of the envelope may be affected, for example, by the non-sinusoidal nature of the modulation tone, as in speech and music, or by the distortion of the transmitter. In such cases, no single quantity can adequately describe the modulation. The average envelope value A, which is the carrier amplitude during modulation, is then the integrated sum of all the amplitudes included within the envelope throughout a complete cycle, divided by the length of the cycle, and is not necessarily equal to the amplitude C of the unmodulated carrier. Moreover, the deviations $p$ and $n$ of the peaks from the average A are not, in general, equal, as in Fig. 4, but may be more as in Fig. 3. In such cases, it is desirable to determine $$\frac{p}{A}, \frac{n}{A}, \frac{p'}{C}, \frac{n'}{C}$$

and the difference between C and A. The ratio $$\frac{A-C}{C}$$

is the fractional change in the carrier output of the generator when the wave is modulated. The percentage modulation $m$ is the average of the positive-peak modulation $$\frac{p}{A}$$

and the negative-peak modulation $$\frac{n}{A}$$

expressed in per cent.

Let the ordinate corresponding to the positive peak 15 be represented by $V_1$, and that corresponding to the negative peak 16 by $V_2$, as illustrated in Fig. 5. From a mere inspection of Fig. 3 or Fig. 4, $$V_1 = A + p$$

and $$V_2 = A - n$$

By means of a simple algebraic transformation, therefore, it may be shown that $$\frac{p}{A} = \frac{V_1 - A}{A}$$

and $$\frac{n}{A} = \frac{A - V_2}{A}$$

To obtain both the positive-peak modulation and the negative-peak modulation, therefore, all that is necessary is to measure $V_1$, $V_2$ and $A$.

If it is desired to determine, as well, the modulation characteristics of the generator producing the wave, the quantity $C$ should also be measured. In the same manner outlined above, it follows that $$\frac{p'}{C} = \frac{V_1 - C}{C}$$

and $$\frac{n'}{C} = \frac{C - V_2}{C}$$

We may obtain the desired ratios, therefore, both in the measurement of a modulated wave and in the determination of the modulation characteristics of a generator, from the four quantities $V_1$, $V_2$, $C$ and $A$.

It will now be explained how, in accordance with this invention, these measurements may be effected.

In Figs. 1 and 2, a linear rectifier 18 is shown connected in circuit with terminals 22, 24, typifying any piece of apparatus,—such as an input transformer, or a small pick-up inductor coupled to the transmitter output,—upon which is impressed the radio-frequency signal voltage to be analyzed. The linear rectifier 18 may be connected directly to the terminals 22, 24, as in Fig. 2, or indirectly, through any desired input-voltage control, such as a voltage divider 21, as illustrated in Fig. 1. An advantage of using an input-voltage control is that it is thus rendered possible to make direct measurements of the ratios $$\frac{p}{A}, \frac{n}{A}, \frac{p'}{C} \text{ and } \frac{n'}{C}$$

as hereinafter described. In Fig. 2, the operating voltage is in series with the load impedance and the rectifier 18, while in Fig. 1, the operating voltage is in series with the rectifier and the load impedance in parallel. A condenser 26 is therefore employed in Fig. 1 to make possible this parallel connection. The rectifier 18 may be of the well known, two-element type, embodying a plate 28 and a heated cathode 30. The output of the rectifier 18 is connected with a load resistor 31, Fig. 2, or, as shown in Fig. 1, with two load resistors 32 and 34. A low-pass filter, shown in Fig. 1 as consisting of two series coils 36 and 38 and a shunt condenser 40, and in Fig. 2 as comprising a series coil 35 and two shunt condensers 37 and 39, insures that only the low-frequency components of the rectifier output shall pass to the resistors 31, 32 and 34. Other types of filters than those illustrated in Figs. 1 and 2 could also be employed, designed so as to filter out substantially all of the radio frequency, but without filtering out the audio frequency. It is these low-frequency components of the rectifier output that are analyzed in accordance with this invention.

Because the rectifier 18 is linear in its characteristics, the voltage across the load resistor 31 (Fig. 2), or the load resistors 32 and 34 (Fig. 1), is a replica of one-half of the envelope of the input radio-frequency voltage applied to the terminals 22, 24. If, therefore, the envelope of the applied radio-frequency voltage has the form illustrated at 4, 10, 6, 12 in Fig. 3, the filtered voltage across the load resistors 31 (Fig. 2) and 32 and 34 (Fig. 1) will be a replica of one-half the envelope, as illustrated at 4, 10 in Fig. 5. Consequently, the quantities $A$, $C$, $n$, $p$, $n'$ and $p'$ of Fig. 5 are directly proportional to the correspondingly lettered quantities of Fig. 3. The problem of making measurements of a modulated wave has thus been reduced to the comparatively simple problem of measuring the peak values of a low-frequency voltage relative to a direct-current voltage.

It will now be shown how to make measurements of $A$, $C$, $V_1$ and $V_2$ shown in Fig. 5. Referring first to Fig. 2, the average value $A$ of the rectified, filtered wave across the resistor 31 may be obtained by closing a switch 52 and throwing a galvanometer 54, in series with an adjustable direct-current voltage 55, 57, across the load resistor 31.

The connections for Fig. 2 are as follows: from the terminal 42, by way of a conductor 44, to one terminal 45 of the switch 52. The circuit continues from the other terminal 49 of the switch 52, by way of a conductor 50, to the galvanometer 54; thence, by way of a conductor 56, to the variable direct-current voltage 55, 57 obtained by means of a voltage divider 58 and a battery 62 in parallel; thence, by a conductor 74, to the other terminal 75 of the resistor 31.

The value of the direct-current voltage 55, 57 is varied until a null indication of the galvanometer 54 is obtained. The value of the direct-current voltage, as read on the voltmeter 59, is then equal to the voltage $A$ of Fig. 5.

To measure the quantities $V_1$ and $V_2$ of Fig. 5, the switch 52 is opened, thus connecting in circuit a second rectifier 48. The temperature of the cathode of the rectifier 48 should be so adjusted that the contact electromotive forces shall be unimportant. The plate current of this rectifier 48 flows only when the plate 60 of the rectifier is positive with respect to the cathode 61. The rectifier 48 is connected across the resistor 31, in series with the galvanometer 54 and the voltage 55, 57, by a reversing switch 46 that is connected with the terminals 45, 49. When the reversing switch 46 is thrown to the left, there will be a galvanometer deflection when the voltage across terminals 45 and 49 becomes positive. With switch 46 reversed, the plate and cathode connections are interchanged, and a deflection will now take place when the voltage across terminals 45 and 49 becomes negative. The values of the opposing voltage at which the galvanometer just begins to deflect for the two positions of the switch 46 will be the two voltages $V_1$ and $V_2$ shown in Fig. 5.

The quantity C may be measured by the same procedure described above for measuring A, if the unmodulated carrier voltage is applied at the input terminals 22, 24 in place of the modulated wave.

As has been indicated above, the ratios $$\frac{p}{A}, \frac{n}{A}, \frac{p'}{C}, \frac{n'}{C}$$

and $$\frac{A-C}{C}$$

may be obtained from the four quantities A, C, $V_1$ and $V_2$ by computation.

The method just described has the disadvantage that computation is necessary to obtain the desired results. Furthermore, it is subject to inaccuracy in the measurement of the quantities A and C. This is because the galvanometer circuit may affect the operation of the linear rectifier. Fig. 2 illustrates more simply, however, than Fig. 1, some of the principles underlying the invention.

The preferred arrangement shown in Fig. 1 eliminates these difficulties. The input voltage control 21 makes it possible to adjust the voltage applied to the rectifier 18 to such a value that the ratios $$\frac{p}{A}, \frac{n}{A}, \frac{p'}{C} \text{ and } \frac{n'}{C}$$

may be read directly on a dial 65 attached to the voltage divider 58. Furthermore, the balance, with the second rectifier 48 cut out of circuit, is made with only a small fraction of the entire load resistance in circuit. Therefore, the operation of the rectifier 18 is not altered by the apparatus used in making this adjustment.

The means employed to enable the ratios $$\frac{p}{A}, \frac{n}{A}, \frac{p'}{C} \text{ and } \frac{n'}{C}$$

to be read directly on the dial 65 of the potentiometer 58 are as follows: A switch 67 is thrown to the left, connecting the galvanometer 54 across the resistances 34 and 77. The galvanometer-circuit connections are from the terminal 79 between the resistors 32 and 34, by way of a conductor 81, to the galvanometer 54; and from the galvanometer 54, by way of a conductor 83, through the resistor 77, to the terminal 76 of the resistor 34. The input-voltage control 21 is varied until the galvanometer gives a null indication. The resistances 34 and 77 are so proportioned that when this balance is obtained, the direct-current voltage across the resistances 32 and 34 is equal to the direct-current voltage across 100 scale divisions of the voltage divider 58. At the same time, the resistance 34 is made very small in comparison with the resistance 32 so that the galvanometer circuit will not cause any appreciable change in the impedance of the output circuit of the rectifier 18. The resistance 34 may, for example, be less than one per cent of the resistance 32, or it may be any other desired small value. Consequently, the operation of the rectifier 18 will not be altered when this balance adjustment is made.

The switch 67 is now thrown to the right, thus connecting the galvanometer 54 in series with the rectifier 48, the variable, direct-current voltage 55, 57, and the entire load resistance 32, 34.

The connection to the rectifier 48, in Fig. 1, is from one end or terminal 85 of the resistor 32, by way of a conductor 87, to the terminal 45 of the reversing switch 46. The connections from there to the rectifier 48 are the same as before described, and continue, by way of the conductor 50, to the galvanometer 54, when the switch 67 occupies its right-hand position. The circuit continues by way of the conductor 56 to the variable, direct-current voltage 55, 57.

Balances are made as above described for the two positions of the reversing switch 46. Since the zero point of the dial 65 has been set automatically at voltage A by means of the preliminary adjustment of the input voltage, the dial settings corresponding to the voltages $V_1$ and $V_2$ will now read directly the ratios $$\frac{p}{A} \text{ and } \frac{n}{A}$$

if the preliminary balance has been made when the modulated voltage is connected across the terminals 22 and 24. If, on the other hand, the preliminary adjustment of the input voltage has been made when the potentiometer wave is unmodulated, the settings made on the modulated wave will give the ratios $$\frac{p'}{C} \text{ and } \frac{n'}{C}$$

instead of the ratios $$\frac{p}{A} \text{ and } \frac{n}{A}$$

It will be noted that it is unnecessary, in this case, to measure $V_1$ and $V_2$, as the desired ratios have been obtained by direct reading on the dial 65.

It is very useful, in making adjustments of a broadcast transmitter, to know whether the carrier output increases or decreases when the transmitter is modulated. It may readily be determined whether the carrier amplitude during modulation A is greater or less than the unmodulated carrier C by making the preliminary balance when the input wave is unmodulated. The sign of the galvanometer deflection when the modulating voltage is applied to the generator indicates whether A is greater or less than C. The ratio $$\frac{A-C}{C}$$

may be obtained by computing the ratio of this deflection to the deflection obtained when the signal voltage is removed from the terminals 22, 24.

The present invention is adapted to many other uses. For example, in monitoring the output of a broadcast transmitter, the instrument of the present invention may be conveniently used to give an indication whenever a predetermined maximum percentage modulation is exceeded. For example, if the dial 65 is set at 50%, the galvanometer needle will remain stationary as long as the percentage of modulation is below this value. As soon as this percentage is exceeded, however, there will be an abrupt deflection which is approximately proportional to the excess modulation. The transmitter volume control may therefore be turned up until the louder portions of speech or music begin to cause deflections of the galvanometer.

Further modifications and changes will occur to persons skilled in the art and all such are considered to fall within the spirit and scope of the invention as defined in the appended claims.

What is claimed is:

1. A method of measuring a modulated alternating-current wave that comprises rectifying the wave, measuring the average value of the rectified wave, and measuring the maximum and minimum values of the rectified wave.

2. A method of measuring a modulated alternating-current wave that comprises rectifying the wave, measuring the average value of the rectified wave, and measuring the deviations of the maximum and minimum values of the rectified wave from the average value of the rectified wave.

3. A method of measuring the amount by which the maximum and minimum values of an alternating-current modulated wave produced by a generator deviate from the value of the unmodulated alternating-current wave produced by the same generator that comprises rectifying the unmodulated wave, measuring the average value of the rectified wave, rectifying the modulated wave, and measuring the maximum and minimum values of the rectified wave.

4. A method of measuring the amount by which the maximum and minimum values of an alternating-current modulated wave produced by a generator deviate from the value of the unmodulated alternating-current wave produced by the same generator that comprises rectifying the unmodulated wave, measuring the average value of the rectified wave, rectifying the modulated wave, filtering the high-frequency components out of the rectified wave, and measuring the maximum and minimum values of the rectified wave.

5. A modulation meter having, in combination, means for rectifying a modulated, alternating-current wave, means for measuring the maximum and minimum values of the rectified wave, and means for comparing the maximum and minimum values of the rectified wave with the average value of the rectified wave.

6. Apparatus for measuring a modulated, alternating-current wave having, in combination, means for rectifying the modulated wave, whereby a rectified wave is produced that is provided with maximum and minimum values and an average value, and means for directly comparing with the average value the deviations of the maximum and minimum values from the average value.

7. A modulation meter having, in combination, means for rectifying a modulated, alternating-current wave, means for measuring the average value of the rectified wave, and means for measuring the maximum and minimum values of the rectified wave.

8. A modulation meter having, in combination, a rectifier, means for connecting the rectifier with a modulated, alternating-current wave source to rectify the modulated wave, means for measuring the average value of the rectified wave, means for measuring the maximum and minimum values of the rectified wave, and means for adjusting the value of the voltage from the source applied to the rectifier so that the average value of the rectified wave shall correspond to a predetermined value.

9. A modulation meter having, in combination, a rectifier, means for connecting the rectifier with a modulated, alternating-current wave source to rectify the modulated wave, an indicator, means for adjusting the value of the voltage from the source applied to the rectifier to correspond to a predetermined reading of the indicator, a rectifier for the rectified modulated wave, means for connecting the rectifier with the rectified modulated wave to rectify the rectified modulated wave, and means for reversing the connections of the connecting means.

10. A method of measuring a modulated, alternating-current wave that comprises rectifying the wave, varying the magnitude of the modulated wave prior to rectification to make the rectified wave equal to a predetermined value, and measuring the maximum and minimum values of the rectified wave.

11. In apparatus comprising a rectifier having an input circuit, an output impedance, and an outside, direct-current voltage source, a method of comparing the average amplitude of a modulated wave with the amplitude of an unmodulated wave that comprises applying, at different times, to the input circuit, the unmodulated wave and the modulated wave, balancing in the two cases the rectified voltage across a relatively small portion of the output impedance against a portion of the direct-current voltage of the outside, direct-current voltage source, and observing the difference in balance in the two cases.

12. Apparatus for measuring the ratio, to the average value of a modulated wave, of the maximum variation in amplitude of the modulated wave from the said average value, that comprises a rectifier having an input circuit and an output impedance, means for applying the modulated wave to the input circuit, an outside direct-current voltage source, means for causing the outside voltage source to oppose the voltage across the impedance, means for varying the amplitude of the applied modulated wave voltage until the direct-current component of the rectified voltage across a predetermined fraction of the impedance is equal to a predetermined fraction of the outside direct-current voltage source, and means for varying the portion of the external voltage source opposing the voltage across the impedance until the opposing voltage is equal to an extreme peak value of the voltage across the impedance.

13. A method of measuring a modulated alternating-current wave that comprises rectifying the wave, filtering the high-frequency components out of the rectified wave, measuring the average value of the rectified, filtered wave, and measuring the deviations of the maximum and minimum values of the rectified, filtered wave from the average value.

14. A modulation meter having, in combination, a rectifier, means for connecting the rectifier with a modulated wave source to rectify the modulated wave, a filter for filtering the high-frequency components out of the rectified wave, means for adjusting the amplitude of the modulated wave applied to the rectifier, means connected with the rectifier for indicating a predetermined average value of the rectified, filtered wave and means calibrated in terms of the said predetermined average value for indicating the said maximum positive and negative deviations from the said average value directly in terms of the said average value.

15. In a modulation meter having a rectifier connected with a modulated wave source for rectifying the modulated wave and a filter for filtering the high-frequency components out of the rectified wave, and means for measuring the maximum positive and negative deviations of the rectified, filtered wave, from a predetermined, average value of the rectified, filtered wave, a method of measurement that comprises adjusting the amplitude of the modulated wave applied to the rectifier to produce the said predetermined, average value of the rectified, filtered wave, thereby to cause the measuring means to measure the said maximum positive and negative deviations of the rectified, filtered wave directly in terms of the said predetermined average value.

16. A method of measuring a modulated alternating-current wave that comprises rectifying the wave to produce a rectified wave that is provided with maximum and minimum values and an average value, and directly comparing with the average value the deviation therefrom of the maximum value.

17. A method of measuring a modulated alternating-current wave that comprises rectifying the wave to produce a rectified wave that is provided with maximum and minimum values and an average value, and directly comparing with the average value the deviation therefrom of the minimum value.

18. Apparatus for measuring an alternating-current modulated wave having, in combination, means for rectifying the modulated wave, whereby a rectified wave is produced that is provided with maximum and minimum values and an average value, and means for directly comparing with the average value the deviation of the maximum value from the average value.

19. Apparatus for measuring an alternating-current wave having, in combination, means for rectifying the modulated wave, whereby a rectified wave is produced that is provided with maximum and minimum values and an average value, and means for directly comparing with the average value the deviation of the minimum value from the average value.

20. Apparatus for indicating modulation of carrier voltage in excess of a predetermined value, including means for deriving modulated direct voltage from the modulated carrier voltage, means for applying a direct voltage to oppose the modulated direct voltage, means for making a fixed fraction of the opposing voltage equal to a fixed fraction of the average modulated direct voltage, means comprising an indicator responsive to the difference between said modulated direct voltage and a variable fraction of said opposing voltage, and means for varying said variable fraction of said opposing voltage in accordance with said predetermined value of modulation.

21. Apparatus for indicating maximum and minimum modulation of carrier voltage in excess of a predetermined value, including means for deriving modulated direct voltage from the modulated carrier voltage, means for applying a direct voltage to oppose the modulated direct voltage, means for making a fixed fraction of the opposing voltage equal to a fixed fraction of the average modulated direct voltage, means comprising an indicator responsive to the difference between said modulated direct voltage and a variable fraction of said opposing voltage, means for selectively connecting the responsive means to said voltage-deriving means and to the direct-voltage applying means to render the responsive means sensitive, selectively, to positive and negative differences, to measure, selectively, the said maximum and minimum modulation, and means for varying said variable fraction of said opposing voltage in accordance with said predetermined value of modulation.

22. Apparatus for indicating modulation of carrier voltage in excess of a predetermined value, including means for rectifying the modulated carrier voltage, means for applying a direct voltage to oppose the rectified voltage, means comprising an indicator responsive to the difference between said rectified voltage and said opposing voltage, and means for varying the relative values of said rectified voltage and said opposing voltage in accordance with said predetermined value of modulation.

WILLIAM NORRIS TUTTLE.